United States Patent
Zhao et al.

(10) Patent No.: US 10,922,350 B2
(45) Date of Patent: Feb. 16, 2021

(54) ASSOCIATING STILL IMAGES AND VIDEOS

(71) Applicant: Google LLC, Mountain View, CA (US)

(72) Inventors: Ming Zhao, Bellevue, WA (US); Yang Song, San Jose, CA (US); Hartwig Adam, Marina del Rey, CA (US); Ullas Gargi, Sunnyvale, CA (US); Yushi Jing, Mountain View, CA (US); Henry Allan Rowley, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/511,522

(22) Filed: Jul. 15, 2019

(65) Prior Publication Data
US 2019/0340194 A1 Nov. 7, 2019

Related U.S. Application Data

(63) Continuation of application No. 16/138,606, filed on Sep. 21, 2018, now Pat. No. 10,394,878, which is a (Continued)

(51) Int. Cl.
*G06F 16/43* (2019.01)
*G06F 16/438* (2019.01)
(Continued)

(52) U.S. Cl.
CPC .......... *G06F 16/438* (2019.01); *G06F 16/41* (2019.01); *G06F 16/435* (2019.01);
(Continued)

(58) Field of Classification Search
CPC .. G06F 16/438; G06F 16/435; G06F 16/7837; G06F 16/41; G06F 16/951;
(Continued)

(56) References Cited

U.S. PATENT DOCUMENTS 5,734,893 A  3/1998 Li
5,893,095 A  4/1999 Jain
(Continued)

OTHER PUBLICATIONS

Baluja, S. et al. "Permutation Grouping: Intelligent Hash Function Design for Audio & Image Retrieval," IEEE International conference on Acoustics, Speech and Signal Processing (2008).
(Continued)

*Primary Examiner* — Manav Seth
(74) *Attorney, Agent, or Firm* — Dority & Manning, PA

(57) ABSTRACT

Methods, systems, and apparatus, including computer programs encoded on computer storage media, for associating still images and videos. One method includes receiving a plurality of images and a plurality of videos and determining whether the images are related to the videos. The determining includes, for an image and a video, extracting features from the image and extracting features frames of the video, and comparing the features to determine whether the image is related to the video. The method further includes maintaining a data store storing data associating each image with each video determined to be related to the image.

20 Claims, 11 Drawing Sheets

Related U.S. Application Data continuation of application No. 13/098,362, filed on Apr. 29, 2011, now Pat. No. 10,108,620.

(60) Provisional application No. 61/329,486, filed on Apr. 29, 2010.

(51) Int. Cl.
   *G06F 16/41* (2019.01)
   *G06F 16/435* (2019.01)
   *G06F 16/951* (2019.01)
   *G06F 16/783* (2019.01)
   *G06K 9/00* (2006.01)
   *G06F 17/10* (2006.01)
   *G06K 9/62* (2006.01)

(52) U.S. Cl.
   CPC ........ *G06F 16/7837* (2019.01); *G06F 16/951* (2019.01); *G06F 17/10* (2013.01); *G06K 9/00751* (2013.01); *G06K 9/629* (2013.01)

(58) Field of Classification Search
   CPC .. G06F 17/10; G06F 16/4387; G06F 16/4393; G06F 16/7847; G06F 16/785; G06F 16/7854; G06F 16/7857; G06F 16/83; G06F 16/835; G06F 16/9035; G06F 16/9038; G06K 9/00751; G06K 9/629
   See application file for complete search history.

(56) References Cited

U.S. PATENT DOCUMENTS

| | | | |
|---|---|---|---|
| 6,240,424 B1 | 5/2001 | Hirata | |
| 6,504,571 B1 | 1/2003 | Narayanswami et al. | |
| 6,567,805 B1 | 5/2003 | Johnson | |
| 7,110,454 B1 | 9/2006 | Chakraborty | |
| 7,240,075 B1* | 7/2007 | Nemirofsky | G06K 9/2081 |
| 7,388,986 B2* | 6/2008 | Bober | G06F 16/5854 |
| | | | 382/190 |
| 7,694,214 B2* | 4/2010 | Liu | G06K 9/222 |
| | | | 715/203 |
| 7,933,338 B1* | 4/2011 | Choudhry | G06F 16/70 |
| | | | 375/240.26 |
| 8,006,197 B1* | 8/2011 | Nevill-Manning | |
| | | | G06F 16/9577 |
| | | | 715/788 |
| RE42,728 E * | 9/2011 | Madrane | G11B 27/034 |
| | | | 715/716 |
| 8,280,195 B2* | 10/2012 | Nakajima | G06K 9/3266 |
| | | | 382/305 |
| 8,364,698 B2* | 1/2013 | Delgo | G11B 27/28 |
| | | | 707/769 |
| 8,429,168 B1 | 4/2013 | Chechik | |
| 8,468,130 B2* | 6/2013 | Bhandari | H04N 21/234309 |
| | | | 707/621 |
| 8,538,957 B1* | 9/2013 | Zhou | G06F 40/51 |
| | | | 707/728 |
| 8,862,582 B2* | 10/2014 | Blewett | G06F 16/951 |
| | | | 707/736 |
| 9,170,700 B2* | 10/2015 | Kaiser | G06F 3/048 |
| 9,652,462 B2 | 5/2017 | Zhao et al. | |
| 10,108,620 B2* | 10/2018 | Zhao | G06F 17/10 |
| 10,394,878 B2* | 8/2019 | Zhao | G06F 16/41 |
| 2002/0010682 A1 | 1/2002 | Johnson | |
| 2003/0097301 A1* | 5/2003 | Kageyama | G06F 16/951 |
| | | | 705/14.52 |
| 2003/0103565 A1 | 6/2003 | Xie | |
| 2004/0071368 A1 | 4/2004 | Chadha | |
| 2006/0143176 A1 | 6/2006 | Mojsilovic | |
| 2007/0005356 A1 | 1/2007 | Perronnin | |
| 2007/0022372 A1* | 1/2007 | Liu | G06F 16/435 |
| | | | 715/201 |
| 2007/0296863 A1 | 12/2007 | Hwang | |
| 2008/0021928 A1 | 1/2008 | Yagnik | |
| 2008/0183742 A1 | 7/2008 | Kapur | |
| 2009/0060294 A1 | 3/2009 | Matsubara et al. | |
| 2009/0148047 A1* | 6/2009 | Nakajima | G06F 16/7844 |
| | | | 382/190 |
| 2009/0228464 A1 | 9/2009 | Jones | |
| 2009/0313239 A1 | 12/2009 | Wen et al. | |
| 2009/0313267 A1 | 12/2009 | Girgensohn et al. | |
| 2009/0327236 A1* | 12/2009 | Denney | G06F 16/90324 |
| 2010/0017389 A1 | 1/2010 | Ogunbona et al. | |
| 2010/0070483 A1 | 3/2010 | Delgo | |
| 2011/0196859 A1 | 8/2011 | Mei | |
| 2011/0225136 A1 | 9/2011 | Tu | |
| 2011/0258149 A1 | 10/2011 | Kanungo et al. | |
| 2012/0166293 A1* | 6/2012 | Jing | G06Q 30/0241 |
| | | | 705/14.71 |
| 2015/0161147 A1 | 6/2015 | Zhao et al. | |
| 2017/0213248 A1* | 7/2017 | Jing | G06T 7/30 |

OTHER PUBLICATIONS

Borth, Damian, et al. "Keyframe Extraction for Video Tagging & Summarization" Informatiktage. vol. 2008. 2008. 6 pages.

Borth, Damian, et al. "Navidgator-similarity based browsing for image and video databases." Annual Conference on Artificial Intelligence. Springer Berlin Heidelberg, 2008. 8 pages.

Decision on Appeal issued in U.S. Appl. No. 13/098,362, dated Feb. 13, 2018, 9 pages.

Gomi, Ai, et al. "CAT: A hierarchical image browser using a rectangle packing technique." 2008 12th International Conference Information Visualisation. IEEE, 2008. 6 pages.

Jing, Y. et al. "VisualRank. Applying PageRank to Large-Scale Image Search," IEEE Transactions on Pattern Analysis and Machine Intelligence, Nov. 2008.

Liu, Yuan, Tao Mei, and Xian-Sheng Hua. "CrowdReranking: exploring multiple search engines for visual search reranking." Proceedings of the 32nd international ACM SIGIR conference on Research and development in informational retrieval. ACM, 2009, 8 pages.

Notice of Allowance issued in U.S. Appl. No. 13/098,362, dated Apr. 26, 2018, 8 pages.

Notice of Allowance issued in U.S. Appl. No. 13/098,362, dated Jun. 15, 2018, 8 pages.

Notice of Allowance issued in U.S. Appl. No. 13/098,368, dated Jan. 12, 2017, 7 pages.

Office Action issued in U.S. Appl. No. 13/098,362 dated Dec. 6, 2012, 19 pages.

Office Action issued in U.S. Appl. No. 13/098,362 dated Jun. 24, 2013, 16 pages.

Office Action issued in U.S. Appl. No. 13/098,362 dated May 28, 2015, 19 pages.

Office Action issued in U.S. Appl. No. 13/098,362 dated Oct. 8, 2014, 23 pages.

Office Action issued in U.S. Appl. No. 13/098,368 dated Dec. 6, 2012, 25 pages.

Office Action issued in U.S. Appl. No. 13/098,368 dated Jun. 11, 2015, 18 pages.

Office Action issued in U.S. Appl. No. 13/098,368 dated Jun. 24, 2013, 12 pages.

Office Action issued in U.S. Appl. No. 13/098,368 dated Oct. 9, 2014, 23 pages.

Office Action issued in U.S. Appl. No. 13/098,368, dated May 9, 2016, 20 pages.

Office Action issued in U.S. Appl. No. 13/098,368, dated Oct. 28, 2016, 20 pages.

Rui, Yong, Thomas S. Huang, and Sharad Mehrotra. "Exploring video structure beyond the shots." Multimedia Computing and Systems, 1998. Proceedings. IEEE International Conference on. IEEE, 1998. 6 pages.

Sivic, Josef, and Andrew Zisserman. "Efficient visual search for objects in videos." Proceedings of the IEEE 96.4 (2008): 548-566. 19 pages.

(56) References Cited

OTHER PUBLICATIONS

Spoerri, Anselm. "Visual mashup of text and media search results." Information Visualization, 2007. IV'07. 11th International Conference. IEEE, 2007. 6 pages.

* cited by examiner

ASSOCIATING STILL IMAGES AND VIDEOS

CROSS-REFERENCE TO RELATED APPLICATIONS

This application is a continuation application of, and claims priority to, U.S. patent application Ser. No. 16/138,606, for "Associating Still Images And Videos," filed Sep. 21, 2018, which is a continuation application of, and claims priority to, U.S. patent application Ser. No. 13/098,362, for "Associating Still Images And Videos," filed Apr. 29, 2011, which application claims the benefit under 35 U.S.C. § 119(e) of the filing date of U.S. Patent Application No. 61/329,486, for "Associating Still Images And Videos," filed Apr. 29, 2010. The disclosure of each of the foregoing applications is incorporated herein by reference.

BACKGROUND

This specification relates to associating still images and videos.

Internet search engines provide information about Internet accessible resources (e.g., Web pages, images, text documents, multimedia content) that are responsive to a user's search query by returning a set of search results in response to the query. A search result is made up of, for example, a Uniform Resource Locator (URL) and a snippet of information for resources responsive to a query. The search results can be ranked (e.g., in an order) according to scores assigned to the search results by a scoring function.

Internet search engines identify and score responsive image and video search results according to text associated with the images and videos. However, some images and videos have little associated text, making it difficult for a search engine to identify responsive images and videos or to determine an accurate score for the images and videos.

SUMMARY

In general, one innovative aspect of the subject matter described in this specification can be embodied in methods that include the actions of receiving resources of a first type and resources of a second type, wherein each resource of one type is a digital image and each resource of the other type is a digital video; determining for each of the resources of the first type whether the resource is related to one or more of the resources of the second type, wherein, for a particular resource of a first type and a particular resource of the second type comprising a particular image and a particular video, determining that the particular image is related to the particular video includes: extracting features from the particular image and extracting features from each of a plurality of frames of the particular video, wherein the plurality of frames are not all the frames in the particular video; and comparing the features extracted from the image and the features extracted from the frames to determine whether the particular image is related to the particular video; and maintaining a data store, the data store storing association data associating each resource of the first type with each resource of the second type determined to be related to the resource of the first type. Other embodiments of this aspect include corresponding systems, apparatus, and computer programs recorded on computer storage devices, each configured to perform the operations of the methods.

These and other embodiments can each optionally include one or more of the following features. The first type is a digital still image and the second type is a digital video. The first type is a digital video and the second type is a digital still image. Determining whether the particular image is related to the particular video further includes: determining a strength of relationship between the particular image and the particular video from a comparison of the extracted features; and determining that the particular image and the particular video are related if the strength of relationship satisfies a threshold. The strength of relationship between the particular image and the particular video is an estimate of visual similarity between the image and the video.

The actions further include selecting the plurality of frames of the particular video. Selecting the plurality of frames comprises selecting a plurality of representative frames. A given resource in the plurality of resources has associated given metadata, and the operations further comprise associating the given metadata with each resource associated with the given resource by the association data in the data store. The actions further include determining that two resources of a first type are both associated with a same resource of the second type by the association data in the data store; and storing data in the data store associating the two resources in response to the determination. The actions further include determining a category for each resource; and extracting features from the particular image and extracting features from the plurality of frames of the particular video each further comprise extracting features identified as relevant to the determined category of the particular image or particular video. Determining a category for each resource comprises determining a category from text associated with the resource. The text comprises query text associated with the resource.

The actions further include receiving a search query; receiving data identifying resources of a first type that are responsive to the search query, the resources of the first type including a first resource; identifying a second resource of a second type associated with the first resource by the association data in the data store; and presenting, in response to the query, search results including a first search result corresponding to the first resource and a second search result corresponding to the second resource. The first resource has associated first metadata including data specifying a first geographic location; the actions further include associating the first metadata with the second resource; and presenting the search results comprises presenting the first search result and the second search result on a map user interface at a location corresponding to the first geographic location. The actions further include determining a strength of relationship between each particular image and each particular video from the comparisons; the data store further includes strength of relationship data indicating the strength of relationship between each image and each video determined to be related to the image; and presenting the search results comprises presenting a user interface, the user interface including clusters of search results and indicating the strength of relationship between the first resource and the second resource. Indicating the strength of relationship between the first resource and the second resource comprises separating the first search result and the second search result in the user interface by a physical distance representing the strength of relationship.

The actions further include receiving a search query; receiving data identifying resources of a first type that are responsive to the search query, the resources of the first type including a first resource; identifying a second resource of a second type associated with the first resource by the association data in the data store; presenting, in response to the query, a first search results user interface including a first search result referencing the first resource and a selectable control; and in response to a user selecting the control, presenting a second search results user interface including a second search result referencing the second resource.

Particular embodiments of the subject matter described in this specification can be implemented so as to realize one or more of the following advantages. Images can be associated with similar videos. Images that are related to the same video can be identified as being related to each other. Videos that are related to the same image can be identified as being related to each other. Metadata for an image or video can be augmented with metadata for related images or videos. Search results that include both images and videos can be presented to users, where only videos or only images were initially identified by a search engine.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
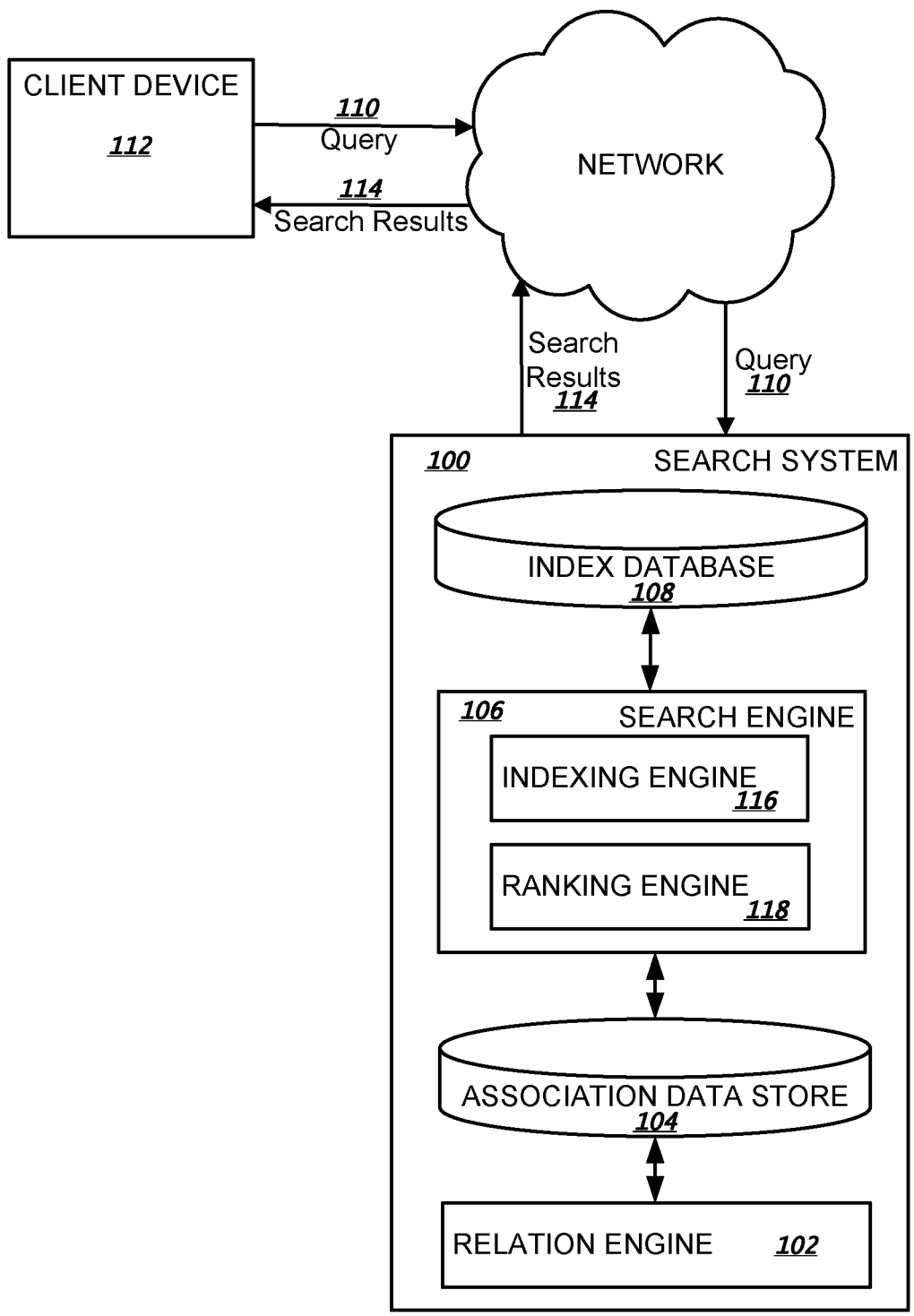
FIG. 1 illustrates an example search system.

FIG. 1 illustrates an example search system 100 for providing search results, e.g., image search results, video search results, and other search results, as can be implemented in an Internet, an intranet, or other client and server environment by one or more computers programmed to perform the operations described below. The search system 100 includes a relation engine 102, a data store 104, a search engine 106, and an index database 108.

The relation engine 102 receives identifying data that identifies videos and images. The term "image" will be used to refer to a still, digital image; generally, a digital image includes data representing a rectangular arrangement of pixels defining a two or three-dimensional representation of a form. The term "video" will be used to refer to a sequence of frames, where each frame is an image. In some implementations, the identifying data are the videos and images themselves; in other implementations, the identifying data are identifiers, for example, globally unique identifiers, for the videos and images.

The relation engine 102 compares one or more of the videos to one or more of the images to determine which, if any, images and videos are related. This comparison is described below with reference to FIGS. 2 and 3. Data associating images and videos that are determined to be related is stored in the association data store 104.

The search engine 106 receives search queries 110 from the client device 112. The client device 112 can be or can include, for example, a computer, e.g., a personal computer, a mobile phone, or another computing device coupled to the system 100 through a wired or wireless local area network (LAN) or wide area network (WAN), e.g., the Internet. Alternatively, the search system 100 and the client device 110 are implemented on the same computer or computers. In response to the search query 110, the search engine 106 generates search results 114 which are transmitted through the network to the client device 110 in a form that can be presented to the user, e.g., in a search results web page to be displayed in a web browser running on the client device 110.

The search engine 106 includes an indexing engine 116 that indexes resources found by the search system 100, for example, documents, videos, or images found while crawling the Internet, in index database 108 and a ranking engine 118 that ranks the search results, for example, according to a result score generated by the search engine 106. In some implementations, the result score is derived from metadata associated with the resources. In these implementations, the search engine 106 can use both the metadata for a resource and the metadata for resources related to the resource in the association data, as described below with reference to FIG. 2. In some implementations, the search engine 106 also includes search results related to responsive resources in the association data, as described in more detail below with reference to FIGS. 4A-4B.

Figure 2:
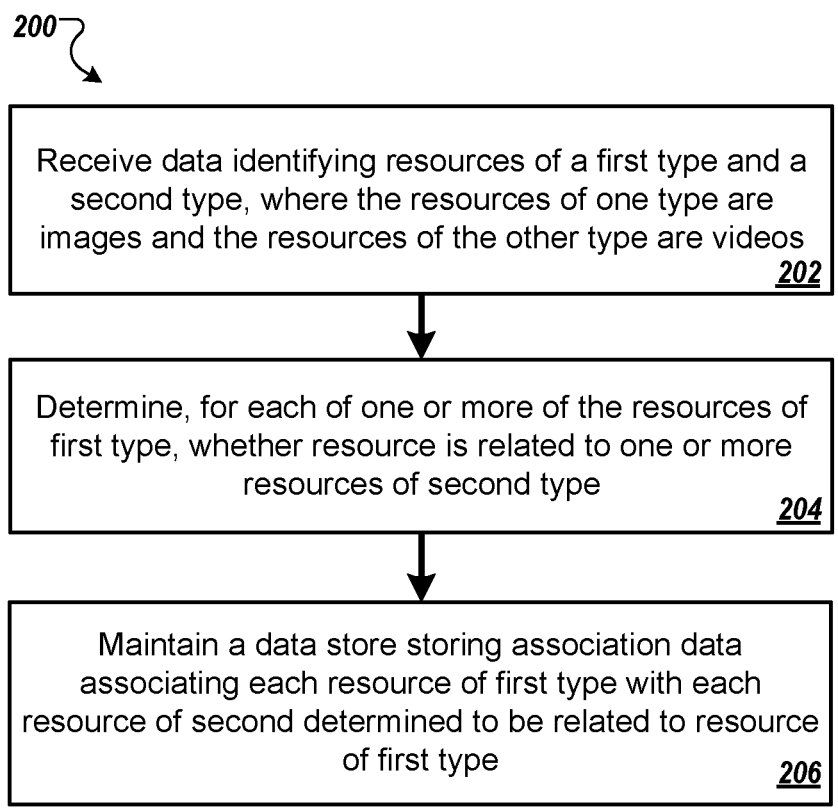
FIG. 2 is a flow chart of an example method for processing images and videos to maintain a data store associating images and videos.

FIG. 2 is a flow chart of an example method 200 for processing images and videos to maintain a data store associating images and videos, e.g., the data store 104. For convenience, the example method 200 is described in reference to a system that performs the method 200. The system can be, for example, the search system 100.

The system receives data identifying resources of a first type and a second type, where the resources of one type are images and the resources of the other type are videos (202). The images and videos can be, for example, images and videos indexed by the search system or images and videos used in advertisements served by the search system.

The system determines, for each of one or more resources of the first type, whether the resource is related to each of one or more of the resources of the second type (204). For example, if the resources of the first type are images, the system determines for each of one or more of the images, whether the image is related to each of one or more of the videos. Or, if the resources of the first type are videos, the system determines for each of one or more of the videos, whether the video is related to each of one or more of the images.

In some implementations, the system compares each image to each video. In other implementations, the system compares each of a subset of the images to an image-specific subset of the videos. The system can select the subsets of images and videos in various ways.

In some implementations, the system compares images and videos responsive to the same, or similar, queries. Similar queries can be queries that normalize to the same form, or queries that include one or more of the same terms. In some implementations, the system compares images from product search results to videos responsive to the same query. In some implementations, the system compares images from product search results to all videos. In some implementations, the system compares images from advertisements to videos responsive to keywords used to trigger the advertisements, or to all videos. In some implementations, the system compares images of movies or television series posters to all videos. In some implementations, the system compares images of particular geographic locations, for example, street view images associated with a map, to all videos. In some implementations, the system compares images of books to all videos.

The system determines whether a particular image is related to a particular video by comparing the image to a number of frames extracted from the video. This comparison is described in more detail below, with reference to FIG. 3.

The system maintains a data store storing association data associating each resource of the first type with each resource of the second type determined to be related to the resource of the first type (206). For example, if the resources of the first type are images, the system maintains a data store storing association data associating each image with each video determined to be related to the image. Or, if the resources of the first type are videos, the system maintains a data store storing association data associating each video with each image determined to be related to the video. In some implementations, the association data also associates an image with a particular frame from the video that best matches, e.g., is the most visually similar to, the image among one or more frames extracted from the video. The system can use the association data in various ways.

In some implementations, the system uses the association data to identify related pairs of images or related pairs of videos. For example, if the system determines that two images are associated with the same video, the system can store data associating the two images. If one image is responsive to a search query, the other image can also be identified as being responsive (or likely responsive) to the search query. The system can similarly associate two videos that are associated with the same image.

In some implementations, the system uses the association data to increase the number of search results identified by a search engine. When the system receives data identifying search results including a search result for a given image, the system can add a search result corresponding to one or more videos related to the image in the association data to the search results. The system can similarly increase the number of search results by including an image search result for an image related to a responsive video. The system can also augment the search results to include images associated with a responsive image or videos associated with a responsive video. The system can also augment a set of search results for an image search to include image search results corresponding to a frame from an associated video that best matches one of the image search results in the set of image search results. Techniques for augmenting search results are described in more detail below, with reference to FIGS. 5A and 5B.

In some implementations, the system can use metadata associated with images and videos. In general, metadata is data describing images or videos. Metadata can describe the content or context of an image or video. For example, the metadata can be geographic location data specifying where an image or video was taken or keyword data specifying keywords describing or otherwise associated with the image or the video. As another example, the metadata can be text describing details about what is pictured in the images and videos. For example, if an image or video shows a product, the metadata for the image or video can be product metadata describing the product, for example, or the price of the product.

The system can augment the metadata for a given image or video by adding to it metadata for videos or images associated with the given image or video. Some images and videos will have more metadata than other images and videos. The search engine can use the augmented metadata to identify and present search results.

Figure 3:
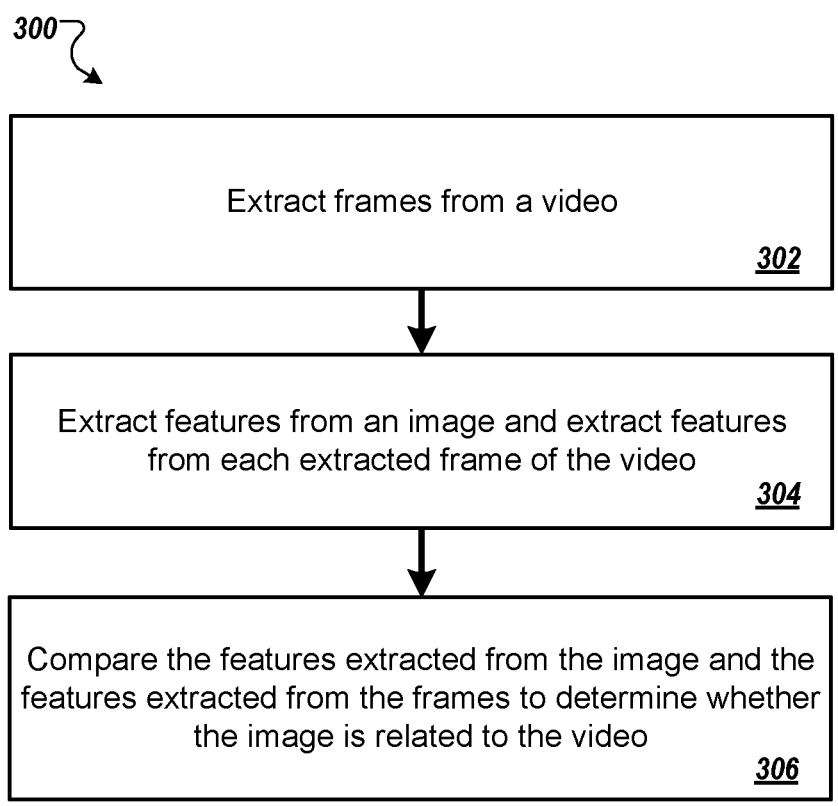
FIG. 3 is a flow chart of an example method for comparing a particular image and a particular video.

FIG. 3 is a flow chart of an example method 300 for comparing a particular image and a particular video. For convenience, the example method 300 is described with reference to a system of one or more computers that performs the method 300. The system can be, for example, the search system 100 that was described with reference to FIG. 1.

The system extracts frames from the particular video (302). The system can extract the frames using any of various conventional frame extraction techniques. The frames extracted by the system can be fewer than all the frames in the particular video. In some implementations, the system selects frames that are representative frames that are selected to summarize the video, as described in more detail below. However, in other implementations, the system selects frames at regular intervals, e.g., every one second, two seconds, or five seconds. Other frame selection techniques, for example, random frame selection, can also be used.

In some implementations, the system extracts representative frames from the video by identifying representative scenes in the video and then extracting a frame from each scene. The system identifies representative scenes in the video by first identifying candidate scenes and then selecting a few of the candidate scenes as representative scenes.

The system identifies candidate scenes by identifying shot boundaries. A shot is a sequence of one or more contiguous frames. Each shot is separated from adjacent shots by shot boundaries, which occur between dissimilar frames. The system can determine that there is a shot boundary between two adjacent frames $F_c$ and $F_{c-1}$ when:

$$\frac{d(F_c, F_{c-1})}{\max_{2 \leq k \leq w} d(F_{c-k}, F_{c-k-1})} > \text{threshold},$$

where w is the length of a window of frames being considered as possibly containing a shot boundary, and $d(F_A, F_B)$ is the distance between the feature vector of frame $F_A$ and the feature vector of $F_B$. The threshold value threshold can be a constant, or can be dynamically adjusted, for example, according to an amount of motion in the video. For example, videos with a lot of motion can have a higher threshold to avoid rapidly changing scenery from the same shot as being mistaken for two different shots.

The distance $d(F_A, F_B)$ can be calculated, for example, according to the following formula:

$$d(F_A, F_B) = 1 - \frac{F_A \cdot F_B}{|F_A||F_B|}.$$

The system then merges successive shots into candidate scenes. The system can determine whether to merge successive shots into the same scene according to the similarity of the shots. The system can calculate the similarity S between shots s1 and s2 according to the following recursive formula:

$$S(s1_{start:end}, s2_{start:end}) = \max \begin{cases} S(s1_{start:end}, s2_{start+1:end}) \\ S(s1_{start+1:end}, s2_{start:end}) \\ S(s1_{start+1:end}, s2_{start+1:end}) + (1 - d(F_{s1_{start}}, F_{s2_{start}}))/\min(L_1, L_2) \end{cases},$$

where $L_1$ and $L_2$ are the lengths of shots s1 and s2 respectively, and $s_{x:y}$ denotes all frames in shot s from frame x to frame y, in sequence.

The system then combines shots that have sufficient similarity. For example, the system can combine into a single scene all consecutive shots whose pair-wise adjacent similarity is in the top 5% of all pair-wise shot similarity values. The system can also use additional indicators, for example, audio breaks, to identify the scenes. An audio break occurs when there is a pause in audio, or a change in the level or type of audio.

The system then determines a measure of similarity between each pair of scenes. This measure of similarity can be determined using the formula described above for calculating shot similarity, where scenes are provided as input instead of shots. Once the scene similarities are calculated, the system calculates a score G for each scene s according to the following formula:

$$G(s) = w_{rel}\left(\sum_i |S(s, s_i) - \mu|\right) + w_{motion}M(s) + w_{audio}A(s),$$

where $\mu$ is the average of the $s_i$ values, M(s) and A(s) are measures of motion and audio in the shot s, respectively, and $w_{motion}$ and $w_{audio}$ are pre-determined weights for detected motion and audio in the shot, respectively. The motion and audio terms are each optional. They are used to assign a higher score to scenes where something interesting may be happening, for example, an action sequence or a gun being fired. The weights $w_{rel}$, $w_{motion}$ and $w_{audio}$ can be learned using machine learning techniques, or can be hand-tuned.

The score G reflects both a relative importance of a scene and, when the terms M(s) and A(s) are included, the motion and audio content of the scene. Important scenes are either very representative of a video, e.g., similar to many the other scenes, or are completely distinct from the other scenes.

The system also clusters the scenes according to their similarities using conventional clustering techniques. The system then selects from each cluster zero or one scenes that best summarize the video. These selected scenes are the representative scenes. The selections of scenes that best summarizes the video are selected to maximize the following equation:

$$\sum_{i=1...k} G(C_i(bestscene)),$$

where k is the total number of clusters, $C_i$ is i-th cluster, and G is zero if no scene was selected for a cluster, and otherwise is the value of G for the best scene selected for the cluster.

In some implementations, the system selects the scenes using an implementation of a dynamic programming algorithm. The dynamic programming algorithm populates a matrix where one dimension corresponds to the clusters of scenes and the other dimension corresponds to increasing periods of time. Time is discretized into small intervals, e.g., 0.5 or 0.1 seconds. The dynamic programming algorithm then iteratively selects, for each cluster and each period of time, the scene from the cluster (if any) that in combination with the best previous combination of scenes would lead to the maximum score. The dynamic programming algorithm selects a best combination of scenes having a length that is less than or equal to a threshold period of time.

The dynamic programming algorithm can compute a score for a given cluster i and a given time period stime and a set of previously considered scenes slist using the following formula:

$$\text{Score}(slist, stime, i) = \\ \begin{cases} \max_j (G(C_i(j)) + \text{Score}([slist\ j], stime - \text{time}(j), i-1)), \\ \quad\quad \text{if } (\text{time}(j) \le stime) \\ 0, \text{ if } (\text{time}(j) > stime) \end{cases}$$

where [slist j] is slist with selected scene j appended to it, and j represents each possible selection of a scene in the cluster i, including selecting no scene from the cluster. The dynamic programming algorithm populates the matrix for each cluster i in turn, so that at the time the formula is evaluated for cluster i and time period stime, the formula has already been evaluated for all clusters that come before cluster i in the matrix and all time periods that are shorter than the stime period. Thus, for example, one calls Score (stime, slist, i) as Score(120, [ ], 20) to obtain a 120 second summary from 20 clusters. As the process proceeds, the empty list [ ] is filled with items.

In other implementations, rather than using clusters of scenes, the system considers each scene individually.

Once the system identifies the representative scenes, the system extracts a representative frame from each scene. For example, the system can extract a frame from the middle of each scene or a frame that is most similar to other frames in the scene. For example, the system can calculate the distance between each pair of frames in the scene using the distance formula described above, and then select the frame having the smallest distance between other frames as the most similar frame.

In other implementations, the system considers scenes made up of a single frame. These scenes can be selected, for example, by sampling frames at regular intervals, e.g., every one second, two seconds, or five seconds. Representative scenes can then be identified as described above. If information from multiple frames, such as motion or audio, is needed to score the scenes, the system can use frames surrounding the frame making up the scene for context.

The system extracts features from the particular image and extracts features from each extracted frame of the video (304). The system compares the features extracted from the image and the features extracted from the frames to determine whether the image is related to the video (306), as is described in more detail below.

In general, the same feature extraction methods are used to extract features from the particular image and from each frame of the particular video. The feature extraction methods can be, for example, conventional feature extraction methods, and the features can be conventional features used for image comparison. For example, one or more feature extraction methods such as the Canny algorithm, the Soble algorithm, the Harris operator, the Shi and Tomasi algorithm, the Level curve curvature algorithm, the Smallest Univalue Segment Assimilating Nucleus (SUSAN) algorithm, the Features from Accelerated Segment Test (FAST), the Laplacian of Gaussian (LoG) algorithm, the Difference of Gaussians (DoG) algorithm, the Determinant of Hessian (DoH) algorithm, the maximally stable extremal regions algorithm, the affine shape adaptation algorithm, the Harris affine algorithm, the Hessian affine algorithm, the Scale-invariant feature transform (SIFT), the Speeded Up Robust Features (SURF) algorithm, the Gradient Location and Orientation Histogram (GLOH) algorithm, the Local Energy based Shape Histogram (LESH) algorithm, and the Hough transform can be used. Example features include edges, corners, blobs, color, and face signatures.

In some implementations, the system uses the same feature extraction methods on all types of images and on frames from all types of videos. In other implementations, the system uses feature extraction methods that are appropriate to a particular type of image and video, where the particular image and particular video have been categorized as being of the particular type. Some feature extraction methods are more effective than others on particular types of images. For example, local features are more useful for comparing landmarks, while features conventionally used in facial recognition are more useful for comparing images of people. As another example, features that assume clear foreground-object versus background separation are useful for comparing images of products.

In some implementations, the system determines the type of the image or video by categorizing the image and video according to text associated with the image or video. Various sources of the text can be used. In some implementations, the text is derived from labels associated with the image or video, e.g., user-defined labels. In some implementations, the text is text surrounding the image or video in a web page. In some implementations, the text is comment text extracted from comments posted by users about the image or video. In some implementations, the text is anchor text from anchors linking to the image or video. In some implementations the text is text extracted from the images and videos using optical character recognition (OCR) techniques. In some implementations, the text is query text from queries associated with the image and the video. These queries can be, for example, the queries that are most commonly associated with the image and video in a query log that associates queries submitted by users with search results selected by the users in response to the query.

In some implementations, the system normalizes the text, e.g., by removing stop words, correcting misspellings, and standardizing word variations before the text is used to determine a type of the image or video. In some implementations, this normalization can be performed by a clustering system that clusters similar text and generates normalized forms of text from the individual clusters.

Once the system has determined text associated with an image or a video, the system categorizes the image or video. In some implementations, the system compares the text to lists of text associated with various categories and selects a category whose list at least some of the text appears on. In other implementations, the system uses a machine learning trained classifier that takes text, and optionally image features, as input and determines an appropriate categorization for an image and a video. The machine learning classifier can be trained, for example, using conventional methods.

In some implementations, the system additionally uses non-text signals to determine a type for the image and video. For example, if the system detects a face in both the image and a frame of the video, the system can categorize the image and video as being of a type that includes a face.

Once the system has assigned a type to the image and the video, the system selects an appropriate feature extraction method according to the type of the image and video. For example, the system can select the feature extraction method associated with the type of the image from a database that associates feature extraction techniques with image and video types. If no type is assigned, or if the type is not in the database, the system uses a default feature extraction method.

In some implementations, the system calculates a respective metric for each frame of the video. The metric is an estimate of the visual differences between the frame of the video and the image. The system then generates an overall metric for the video and the image from the respective metrics. For example, the overall metric can be the minimum, maximum, or median, mode, geometric mean, harmonic mean, or arithmetic mean of the respective metrics.

The system then derives a strength of relationship for the image and the video from the metric. The strength of relationship is an estimate of how closely related the image and the video are, in terms of measured visual similarity. The strength of relationship can be the metric itself, or a value derived from the metric, for example, the inverse of the metric, one minus the metric, the log of the metric, the metric raised to a particular power, or some other value derived from the metric. The strength of relationship can thus measure either a similarity or a dissimilarity between the two images.

The system determines whether the image and the video are related by comparing the strength of relationship to a predetermined threshold. If the strength of relationship satisfies the threshold, the image and video are determined to be related. The system can then store data associating the image and video, and optionally the strength of relationship, for example, in the association data store.

Various algorithms for calculating the metric for a frame of the video and an image can be used. In some implementations, the system generates a hash key corresponding to the features of the frame and a hash key corresponding to the features of the image. The system then calculates the metric by determining the Hamming distance between the two hash keys.

In some implementations, the system generates the hash key using a T-bit hash function that is a collection of T binary hash functions, each of which takes a vector of features as input and outputs a 0 or 1 corresponding to a single bit in the hash key.

The T-bit hash function can be trained based on an affinity matrix that identifies similarity between each pair of images in a set of training data. The training can be performed using machine learning techniques that modify the individual binary hash functions to increase the Hamming distance between dissimilar objects according to the affinity matrix and decrease the Hamming distance between similar objects according to the affinity matrix.

Other algorithms for generating the hash key for a given image or frame can also be used. For example, the system can use locality sensitive hashing (LSH), parameter sensitive hashing, or spectral hashing.

Other conventional methods for determining nearest neighbors, for example, KD-trees, or permutation grouping can also be used to determine whether an image and a frame are sufficiently similar to be related. Permutation grouping is described in more detail in S. Baluja, M. Covell and S. Ioffe, "Permutation Grouping: Intelligent Hash Function Design for Audio & Image Retrieval," IEEE International Conference on Acoustics, Speech, and Signal Processing (2008).

Figure 4A:
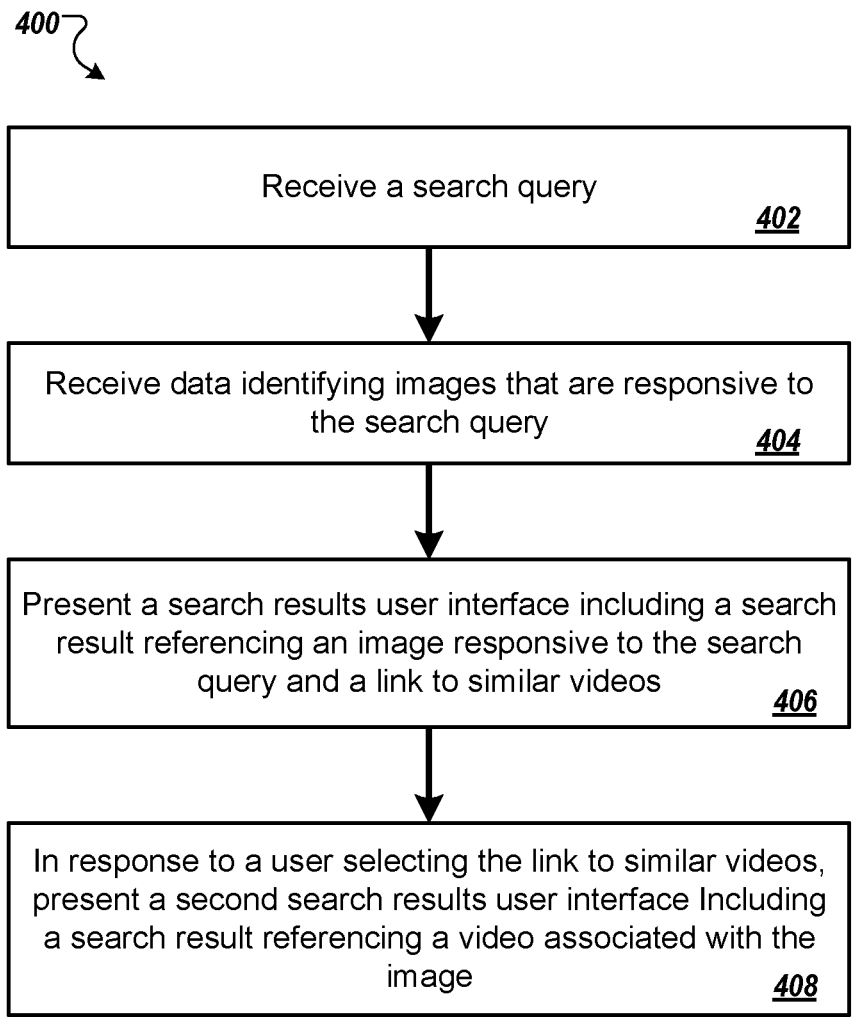
FIGS. 4A and 4B are flow charts of example methods for increasing the number of search results returned in response to a query.
Figure 4B:
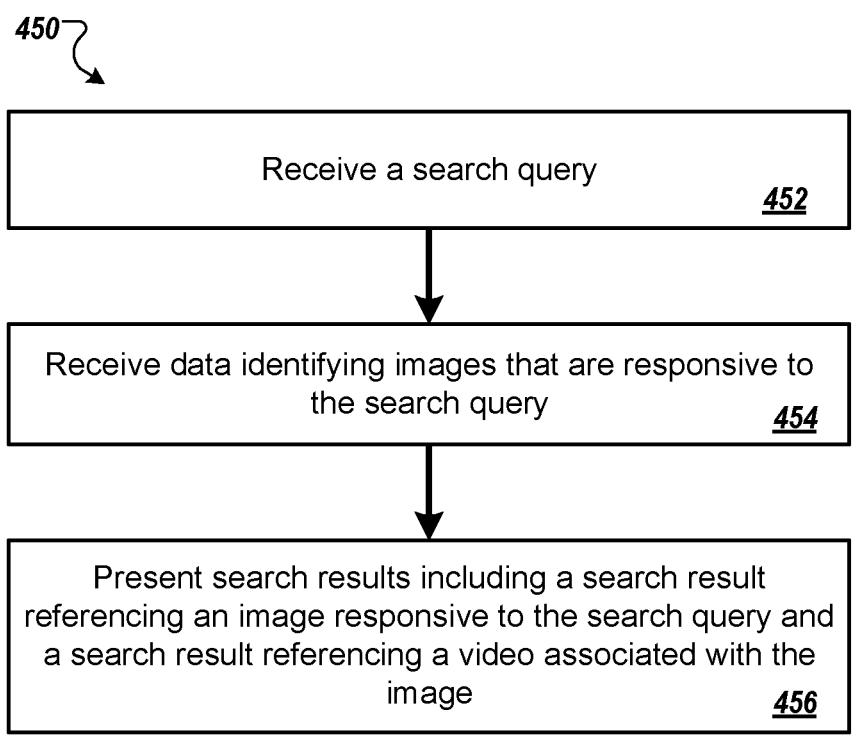

FIGS. 4A and 4B are flow charts of example methods for increasing the number of search results returned in response to a query.

FIG. 4A is a flow chart of an example method 400 for presenting an image search results user interface including a link to a second search results user interface with related videos. For convenience, the method 400 is described in reference to a system that performs the method. The system can be, for example, the search system 100 that was described with reference to FIG. 1.

The system receives a search query (402). The system receives data identifying images that are responsive to the search query (404). The system presents a search results user interface including a search result referencing an image responsive to the search query, and a link to similar videos (406), i.e., videos similar to the responsive image. An example user interface is described below with reference to FIG. 5A. In response to a user selecting the link to similar videos, the system presents a second search results user interface including a search result referencing a video associated with the image (408). An example of the second search results user interface is described below with reference to 5B. The second search results user interface can identify multiple videos associated with the image. The system can use the association data to identify one or more videos associated with an image.

While the above describes identifying videos associated with image search results, in some implementations, the system instead, or also, identifies images associated with video search results.

FIG. 4B is a flow chart of an example method 450 for presenting a search results user interface including image search results and video search results. For convenience, method 450 is described in reference to a system that performs the method. The system can be, for example, the search system 100 that was described with reference to FIG. 1.

The system receives a search query (452). The system receives data identifying images that are responsive to the search query (454). The system presents search results including a search result referencing an image responsive to the search query and a search result referencing a video associated with the image (456).

The system can present the search results in different formats, including, for example, a traditional search results user interface where video search results are positioned near their associated image search results, in a cluster-based user interface, where search results are clustered based on similarities, or in a map-based user interface, where search results are presented according to geographic metadata associated with the images and videos.

In some implementations, the system presents the search results in a search results user interface. The video search results can be positioned near the image search results with which they are associated. In some implementations, the video search results are labeled as being related search results. An example of this kind of presentation is described in more detail below with reference to FIG. 6.

In some implementations, the system clusters the search results into hierarchical clusters and presents the results according to clusters. For example, the system can generate hierarchical clusters of images responsive to the query using one or more conventional clustering methods, for example, a Hierarchical Agglomerative Clustering (HAC) method, a step-wise clustering method, a k-mediods clustering method, or an Affinity-Propagation clustering method. Each of these methods clusters the images based on features extracted from the images. Once the images are clustered, the system adds videos associated with the images to the clusters for the images. For example, the system can add each video associated with an image to the cluster for the image. In some implementations, when the same video is associated with multiple images in different clusters, the video can be added to each cluster. In some implementations, a video is only added to a cluster if it matches multiple images in the cluster.

Once the clusters are generated, the system selects a canonical image or video from each cluster. The canonical image or video can be selected using any combination of ranking mechanisms, mathematical techniques, or graphical techniques. In some implementations, the system selects the image or video having the highest rank, e.g., as calculated by the search system 414, as the canonical image or video for the cluster.

The system can use various techniques to select a canonical image or video for a cluster. For illustrative purposes, the example techniques described below are described in reference to selecting a canonical image. However, the same techniques could be applied to one or more representative frames of videos in order to select a canonical image or video.

In some implementations, the system generates an image similarity graph based on common features between images. In general, the image similarity graph represents images and their respective similarities. The system derives a global ranking of images from the image similarity graph, and optionally combines the global ranking with other non-visual signals to determine a relevancy score for each image in the cluster. For example, text-based signals, e.g., hyperlinks, labels, and other metadata associated with the images, can be combined with the global ranking to determine the relevancy scores. The system then selects the image in the cluster having the highest relevancy score as the canonical image.

In some implementations, the system calculates a rank for each image based on the visual similarity among the images, and uses the calculated ranks to select the canonical image for each cluster. Local descriptors, e.g., Harris corners, Scale Invariant Feature Transform, Shape Context, and Spin Images, can be used to determine visual similarity.

For a set of images, the rank can be calculated by (1) generating local descriptors for the set of image search results (2) constructing a collection of hash tables and indexing each local descriptor into each of the hash tables (3) aggregating images with identical hash keys across all hash tables for each local descriptor and (4) regrouping matched features by the images that can be associated with the local descriptor. Typically, image pairs are considered matched if the images share more than a threshold number, e.g., three, matched descriptors. The similarity value between two images is computed by the total number of matches normalized by the average number of local features of the two images. The image having the highest similarity value with other images is the canonical image for an image cluster. The use of visual similarity is described in greater detail in Y. Jing and S. Baluja, "VisualRank: Applying PageRank to Large-Scale Image Search," IEEE Transactions on Pattern Analysis and Machine Intelligence, November 2008.

In some implementations, the system uses additional signals to identify a canonical image for a particular image cluster. The additional signals can be quality scores, image features, and other content based features. For example, content based features include the intensity of an image, edge based features of an image, metadata within an image, and text within an image. Other techniques of generating hierarchical image clusters and subsequently selecting respective canonical images can be used.

In some other implementations, ranking scores are calculated by analyzing image signals to determine a visual theme. For example, a number of images which contain a company logo can be retrieved in an online search query for the phrase "[company] logo." In some of these images, the logo is the main focus of the image, whereas, in others, it occupies only a small portion. The repetition of the logo in a large fraction of the images returned in the search query is a strong image signal that can be used to infer a common visual theme throughout the image set.

In some implementations, the system injects standard image ranking results into the image similarity graph computation to bias an end result. For example, the system can use current Web rankings of image content along with other similarity based rankings to bias the new rankings such that highly ranked images are more likely to be placed near the top when the next ranking is performed.

Once the system identifies the clusters and the canonical images and videos for each cluster, the system presents the search results according to the clusters. For example, the system can present a top-level view of the clusters, where each cluster at the top of the hierarchy is represented by its canonical image. Users can then zoom in on individual clusters to see more of the images and videos in the cluster. An example of this presentation is described below with reference to FIGS. 7A and 7B.

In some implementations, the search results are presented on a map user interface. Each search result is presented at a location on the map that corresponds to geographic location metadata for the image or video corresponding to the search result. When a given image or a video does not have associated geographic location metadata, the geographic location metadata from the image or video associated with the given image or video can be associated with the given image or video and used to determine the appropriate location for the search result. An example map user interface is described in more detail below with reference to FIG. 8.

While the above describes receiving data identifying images responsive to a query, and generating search results for those images and videos associated with those images, in some implementations, the system instead receives videos responsive to a query and generates search results for those videos and images associated with those videos.

Figure 5A:
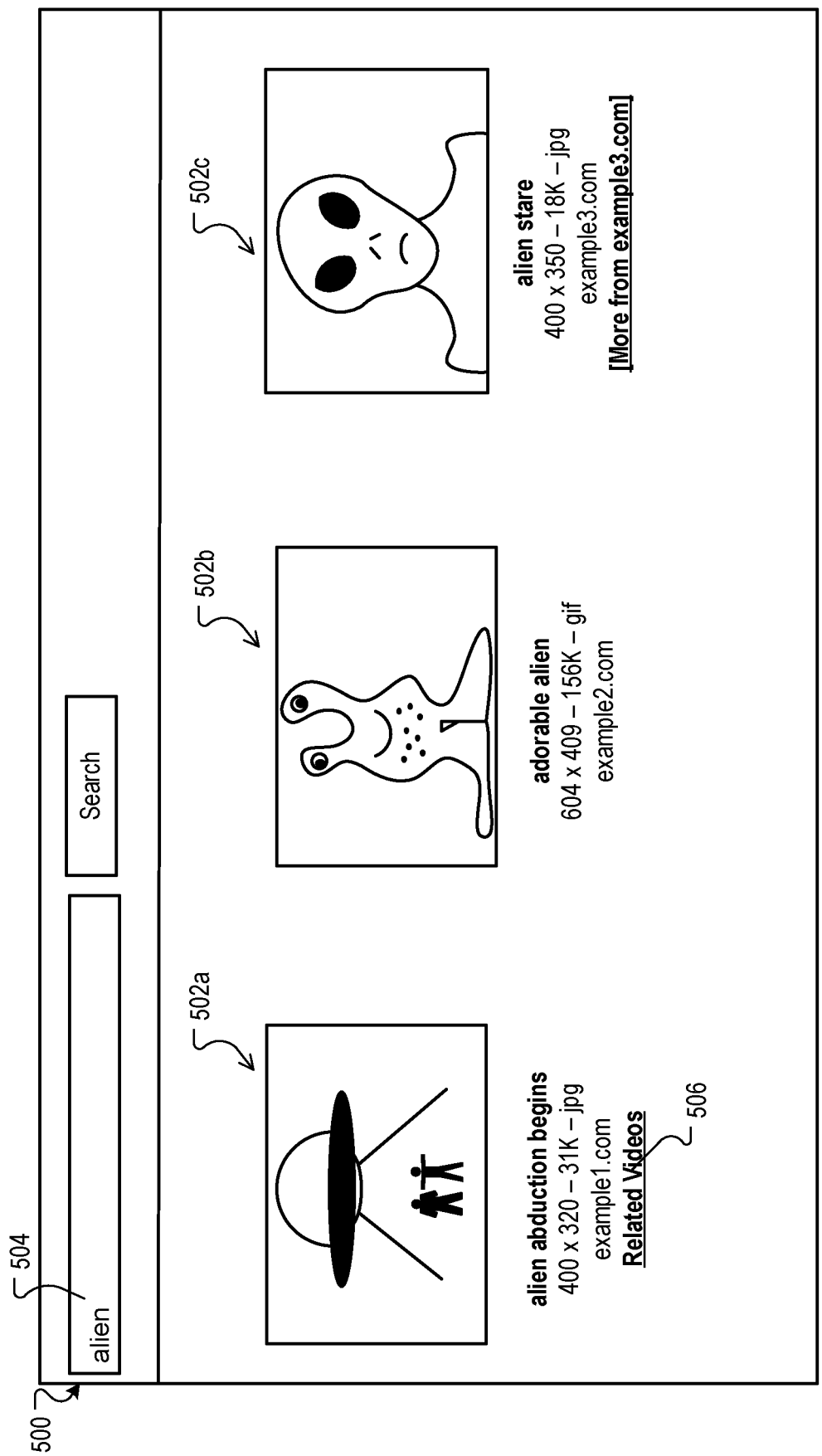
FIG. 5A illustrates an example search user interface displaying image search results responsive to a query.

FIG. 5A illustrates an example search user interface 500 displaying image search results (502a, 502b, and 502c) responsive to a query 504. Each image search result includes a representation, e.g., thumbnail, of the image, and additional information about the image, e.g., text surrounding the image, a size of the image, a file type of the image, and a uniform resource locator (URL) of the image or of the website from which the image was retrieved. A user can view a larger version of an image by selecting the appropriate image search result.

The image search result 502a also includes a link 506 to related videos. When a user selects the link 506, the user is presented with a second user interface that includes search results for videos that were identified as being related to the image corresponding to the search result 502a.

Figure 5B:
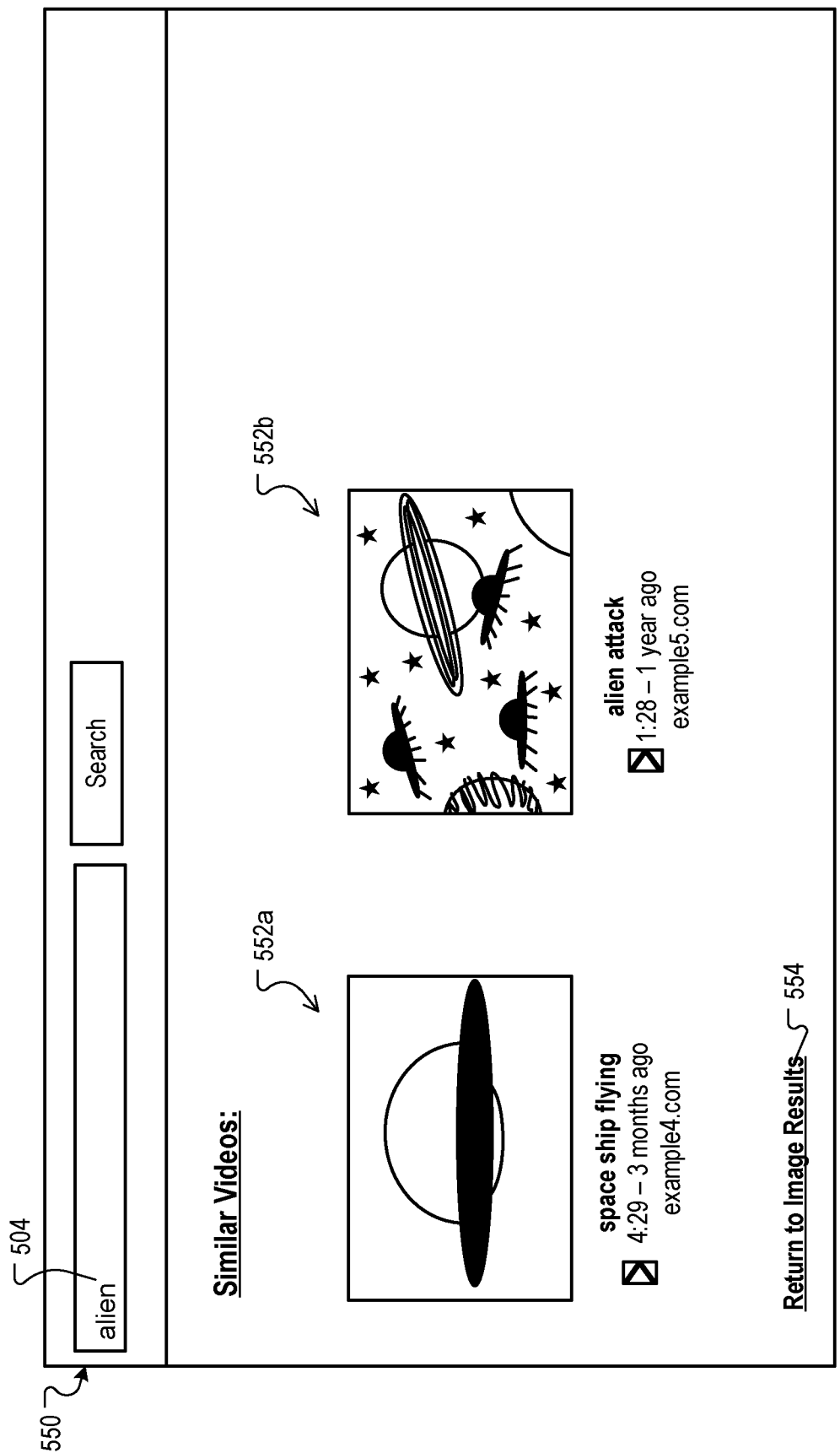
FIG. 5B illustrates an example second user interface displaying video search results that are related to an image for one of the image search results displayed in FIG. 5A.

FIG. 5B illustrates an example second user interface displaying video search results (552a and 552b) that are related to the image for image search result 502a. Each of the video search results includes a thumbnail image of a frame of the video, and other details about the video, e.g., the length of the video and the website that hosts the video. A user can play any of the videos by selecting a link or a control in the appropriate video search result.

A user can return to the image search results user interface 500 by selecting the return to image results control, e.g., link, 554.

Figure 6:
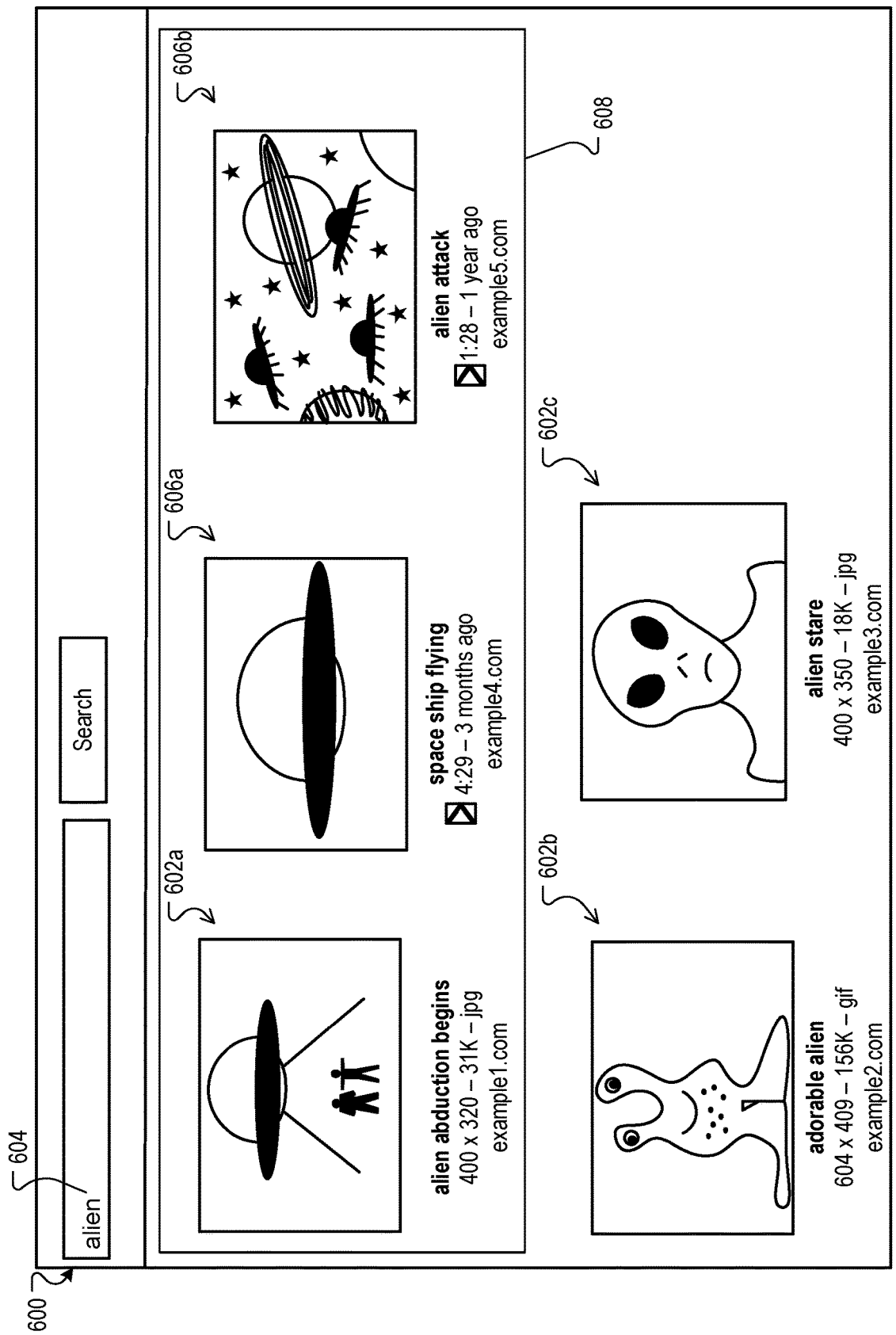
FIG. 6 illustrates an example search user interface displaying image search results responsive to a query.

FIG. 6 illustrates an example user search user interface 600 displaying image search results (602a, 602b, and 602c) responsive to a query 604. Each image search result includes a representation, e.g., thumbnail, of the image, and additional information about the image, e.g., text surrounding the image, a size of the image, a file type of the image, and a uniform resource locator (URL) of the image or of the website from which the image was retrieved.

The user interface 600 also includes video search results (606a and 606b) for videos that are associated with the image corresponding to image search result 602a. The videos corresponding to the video search results 606 are identified from the association data. The user interface identifies the association of video search results 606a and 606b and image search result 602a by displaying box 608 around the associated search results. However, other indications can also be used.

Figure 7A:
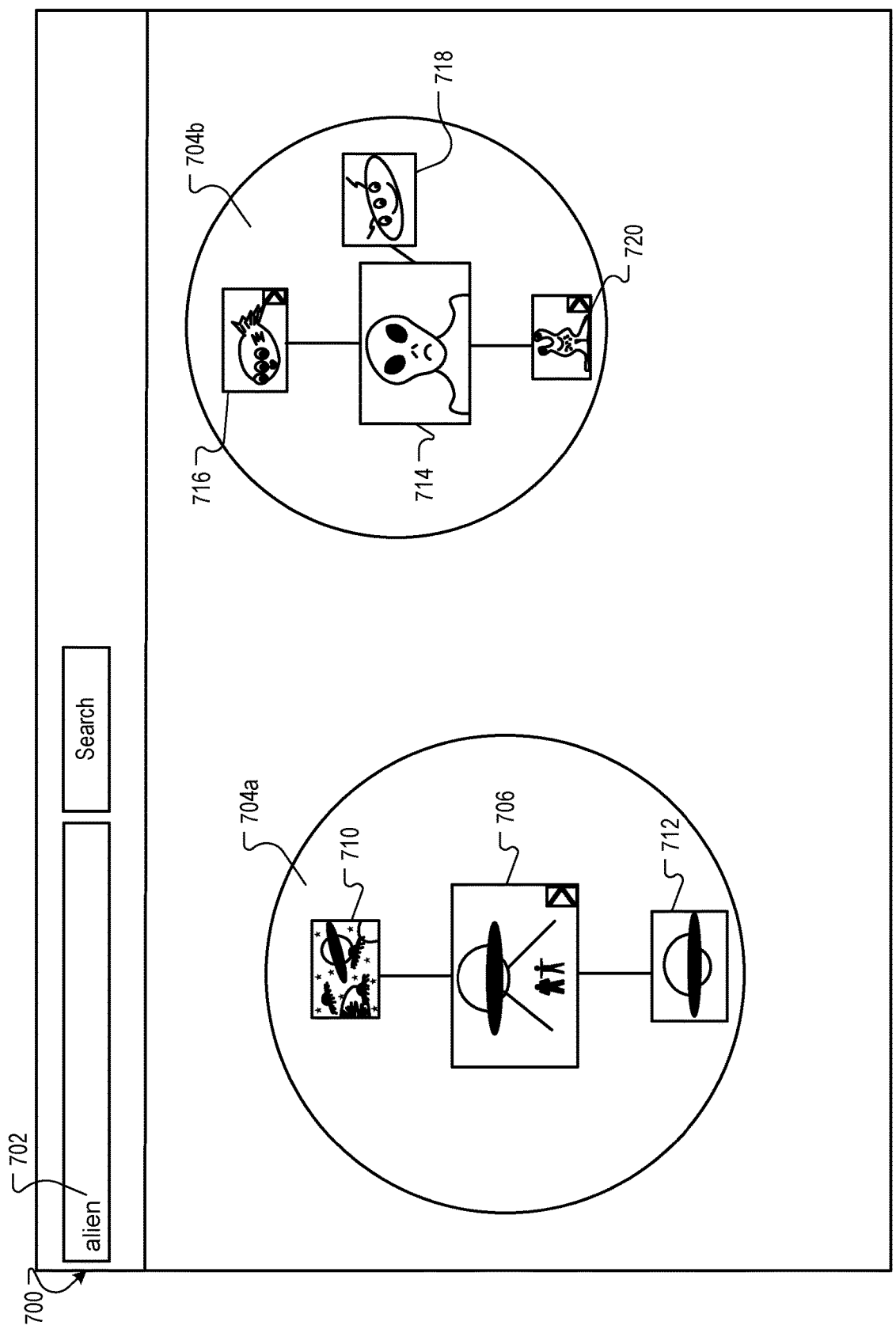
FIG. 7A illustrates an example user interface displaying clusters of image and video search results responsive to a query.

FIG. 7A illustrates an example user interface 700 displaying clusters of image and video search results responsive to a query 702. The user interface 700 presents two clusters 704a and 704b of search results. The clusters shown in FIG. 7A are circular in shape; however, image clusters can take any shape that depicts a particular hierarchy including, for example, dendograms, polygons, lines, spheres, flowcharts, file trees, and other 2-D or 3-D shapes.

Each cluster shows a thumbnail of the canonical image or video for the cluster at the center of the cluster, and thumbnails of canonical images or videos for child clusters arranged around the canonical image or video. For example, in the cluster 704a, a thumbnail of canonical video 706 is at the center of the cluster, and thumbnails of other images (710 and 712) are arranged around the thumbnail of the canonical video 706. Each of the other images is a canonical image for a child cluster of cluster 704a, according to a hierarchical clustering of the images and videos responsive to search query 702. Similarly, in cluster 704b, a thumbnail of canonical image 714 is at the center of the cluster, and thumbnails of canonical video 716, canonical image 718, and canonical video 720 are arranged around the thumbnail canonical image 714.

The user interface 700 uses distance, connection lines, or lack of connection lines to indicate relationships between images and videos. If there is a line between a thumbnail of one image or video and another thumbnail of an image or video, it indicates that the two images or videos have a relationship. The distance between the two images or videos indicates the strength of the relationship—the closer the images or videos, the stronger the relationship. The relationship between two images can be calculated as part of the clustering process. The strength of relationship between an image and a video can be calculated as described above with reference to FIG. 3. For example, there is no line connecting the thumbnail of the video 706 to the thumbnail of the image 714. Therefore, there is no relationship between these videos. However, there are lines connecting the thumbnail of the video 716 to the thumbnail of the image 714 and the thumbnail of the image 718 to the thumbnail of the image 714. Therefore, both video 716 and image 718 have a relationship with image 714. The thumbnail of the image 718 is closer to the thumbnail of the image 714 than the thumbnail of the video 716 is; therefore, image 718 has a stronger relationship with image 714 than video 716 does.

While FIG. 7A illustrates the strength of relationship between images and videos using the distance between the images and videos, in other implementations, other representations, for example, a color of the lines connecting images and videos, or a number presented near the lines connecting images and videos can alternatively or additionally be used.

A user can zoom in on one of the clusters to see additional details about the cluster.

Figure 7B:
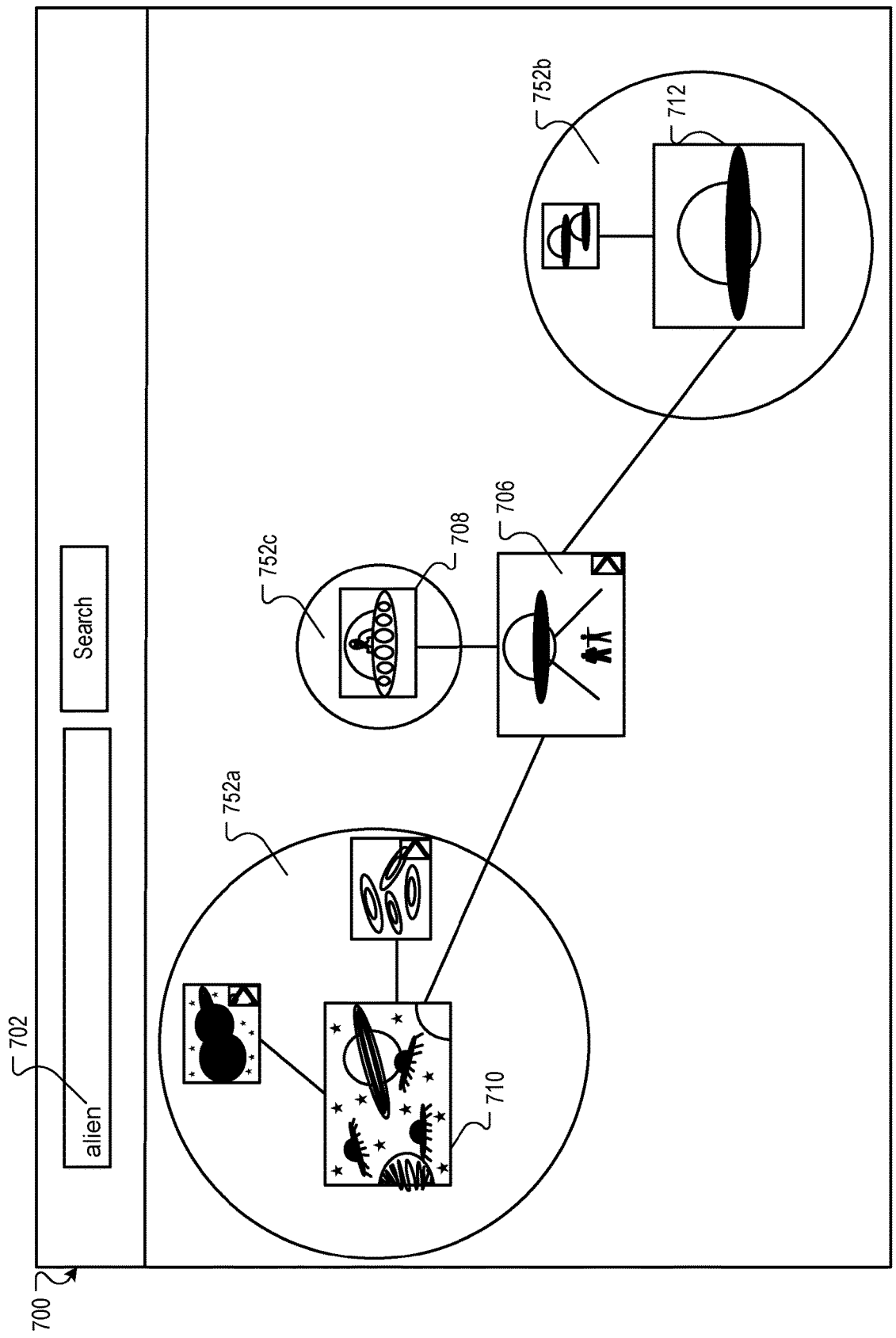
FIG. 7B illustrates the example user interface after a user has zoomed in on a cluster.

FIG. 7B illustrates the example user interface 700 of FIG. 7A after a user has zoomed in on cluster 704a. Canonical image 706 is presented at the center of cluster 704a. Image 706 is connected to child clusters 752a, 752b, and 752c. Each child cluster is presented by displaying a thumbnail of a canonical image for the child cluster at the center of the cluster (images 708, 710, and 712), and displaying thumbnails of images representing other child clusters, if any, for each child cluster. A user can continue zooming in to see additional details for each child cluster.

Figure 8:
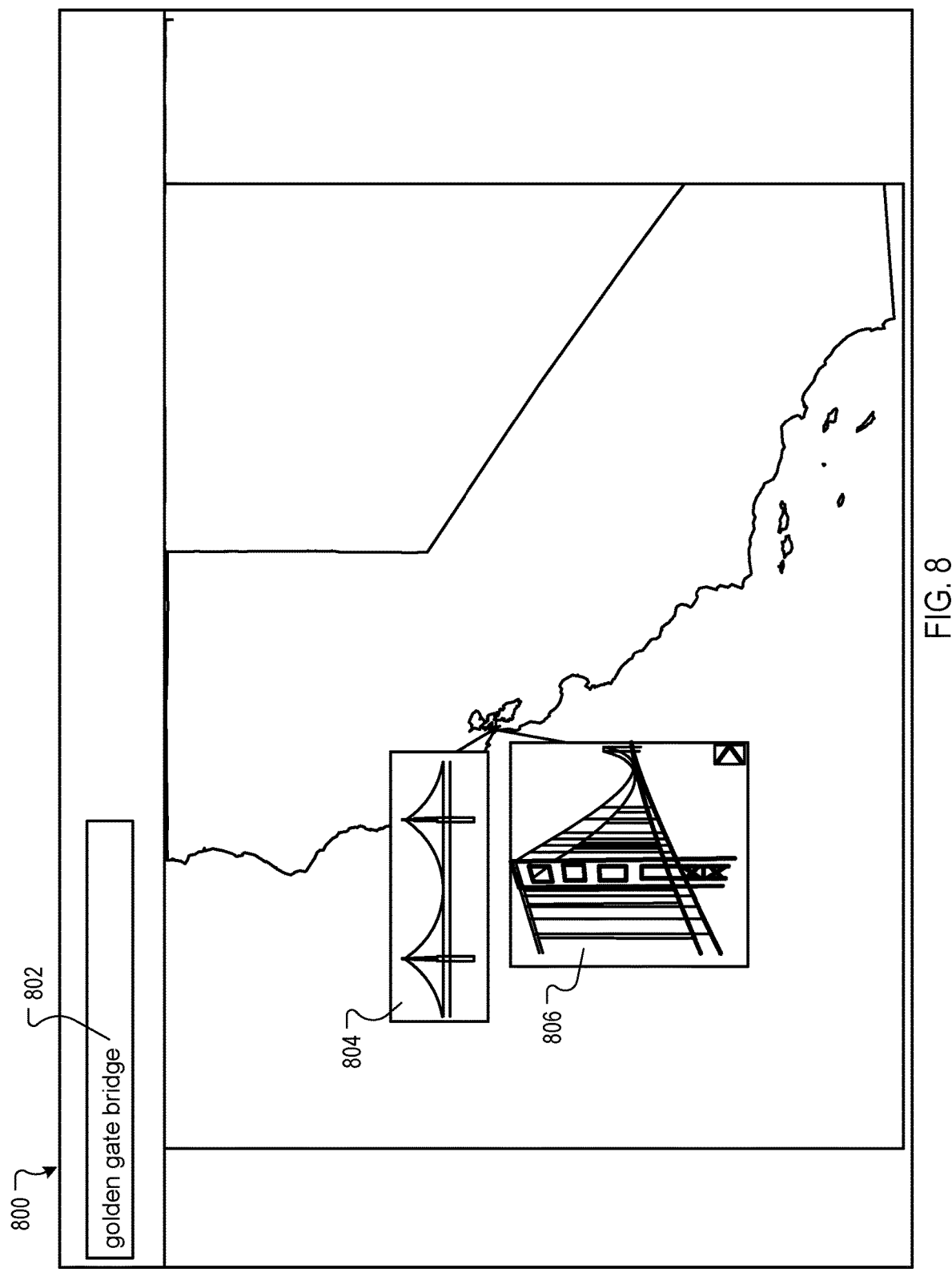
FIG. 8 illustrates an example user interface displaying search results responsive to a query on a map-based user interface.

FIG. 8 illustrates an example user interface 800 displaying search results responsive to a query 802 on a map-based user interface. In response to a query for "golden gate bridge," interface 800 displays an image search result 804 and a video search result 806 responsive to the query. The results are displayed at a location on the map corresponding to geographic metadata for the image and video. The geographic metadata can be associated with the image and video at the time the image and video are captured, or can be geographic metadata for other images and videos that are identified as being similar to the image and video, as described above with reference to FIG. 2.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the association data in the association data store can be used in systems other than a search system. For example, the association data can be generated for images and videos stored on a personal computer and used by photo software executing on the personal computer to identify potential relationships between a user's videos and photos. The photo software can then group or tag related images and videos for the user.

As another example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers including one or more storage devices storing instructions that when executed by the one or more computers cause the one or more computers to perform operations comprising:
   receiving a search query submitted by a user of a user device;
   identifying one or more images that are responsive to the search query;
   determining that a video is related to one or more of the images responsive to the search query, wherein determining that the video is related to a particular image responsive to the search query comprises:
      extracting one or more features from the particular image responsive to the search query;
      extracting one or more features from the video;
      comparing the features extracted from the particular image responsive to the search query to the features extracted from the video; and
      determining that the video is related to the particular image responsive to the search query based on the comparison of the features extracted from the particular image responsive to the search query to the features extracted from the video; and
   presenting the video alongside the images that are responsive to the search query on a display of the user device.

2. The system of claim 1, wherein extracting one or more features from the video comprises:
   identifying one or more representative frames in the video, wherein each representative frame is representative of a portion of the video; and
   extracting one or more respective features from each representative frame.

3. The system of claim 1, wherein the images are still images.

4. The system of claim 1, wherein determining that the video is related to the particular image responsive to the search query based on the comparison of the features extracted from the particular image responsive to the search query to the features extracted from the video comprises:
   determining a strength of relationship between the particular image and the video based on the comparison of the features extracted from the particular image to the features extracted from the video; and
   determining that the video is related to the particular image if the strength of relationship satisfies a threshold.

5. The system of claim 4, wherein the strength of relationship between the particular image and the video is an estimate of visual similarity between the particular image and the video.

6. The system of claim 1, further comprising determining a category of the video and a category of the particular image;
wherein extracting features from the video comprises extracting features based on the category of the video; and
wherein extracting features from the particular image comprises extracting features based on the category of the particular image.

7. The system of claim 6, wherein determining the category of the video comprises determining the category from text associated with the video, and determining the category of the particular image comprises determining the category from text associated with the particular image.

8. The system of claim 1, wherein the video is presented alongside the images that are responsive to the search query on the display of the user device in response to the search query submitted by the user and prior to the user submitting subsequent search queries.

9. A method performed by one or more data processing apparatus, the method comprising:
receiving a search query submitted by a user of a user device;
identifying one or more images that are responsive to the search query;
determining that a video is related to one or more of the images responsive to the search query, wherein determining that the video is related to a particular image responsive to the search query comprises:
extracting one or more features from the particular image responsive to the search query;
extracting one or more features from the video;
comparing the features extracted from the particular image responsive to the search query to the features extracted from the video; and
determining that the video is related to the particular image responsive to the search query based on the comparison of the features extracted from the particular image responsive to the search query to the features extracted from the video; and
presenting the video alongside the images that are responsive to the search query on a display of the user device.

10. The method of claim 9, wherein extracting one or more features from the video comprises:
identifying one or more representative frames in the video, wherein each representative frame is representative of a portion of the video; and
extracting one or more respective features from each representative frame.

11. The method of claim 9, wherein the images are still images.

12. The method of claim 9, wherein determining that the video is related to the particular image responsive to the search query based on the comparison of the features extracted from the particular image responsive to the search query to the features extracted from the video comprises:
determining a strength of relationship between the particular image and the video based on the comparison of the features extracted from the particular image to the features extracted from the video; and
determining that the video is related to the particular image if the strength of relationship satisfies a threshold.

13. The method of claim 12, wherein the strength of relationship between the particular image and the video is an estimate of visual similarity between the particular image and the video.

14. The method of claim 9, further comprising determining a category of the video and a category of the particular image;
wherein extracting features from the video comprises extracting features based on the category of the video; and
wherein extracting features from the particular image comprises extracting features based on the category of the particular image.

15. The method of claim 14, wherein determining the category of the video comprises determining the category from text associated with the video, and determining the category of the particular image comprises determining the category from text associated with the particular image.

16. One or more non-transitory computer storage media storing instructions that when executed by one or more computers cause the one or more computers to perform operations comprising:
receiving a search query submitted by a user of a user device;
identifying one or more images that are responsive to the search query;
determining that a video is related to one or more of the images responsive to the search query, wherein determining that the video is related to a particular image responsive to the search query comprises:
extracting one or more features from the particular image responsive to the search query;
extracting one or more features from the video;
comparing the features extracted from the particular image responsive to the search query to the features extracted from the video; and
determining that the video is related to the particular image responsive to the search query based on the comparison of the features extracted from the particular image responsive to the search query to the features extracted from the video; and
presenting the video alongside the images that are responsive to the search query on a display of the user device.

17. The non-transitory computer storage media of claim 16, wherein extracting one or more features from the video comprises:
identifying one or more representative frames in the video, wherein each representative frame is representative of a portion of the video; and
extracting one or more respective features from each representative frame.

18. The non-transitory computer storage media of claim 16, wherein the images are still images.

19. The non-transitory computer storage media of claim 16, wherein determining that the video is related to the particular image responsive to the search query based on the comparison of the features extracted from the particular image responsive to the search query to the features extracted from the video comprises:
determining a strength of relationship between the particular image and the video based on the comparison of the features extracted from the particular image to the features extracted from the video; and
determining that the video is related to the particular image if the strength of relationship satisfies a threshold.

20. The non-transitory computer storage media of claim 19, wherein the strength of relationship between the particular image and the video is an estimate of visual similarity between the particular image and the video.

* * * * *